United States Patent
Koeppen et al.

(10) Patent No.: US 6,583,898 B1
(45) Date of Patent: Jun. 24, 2003

(54) OPTICAL TRANSMISSION DEVICE AND METHOD FOR CHECKING TRANSMISSION IN AN OPTICAL TRANSMISSION DEVICE

(75) Inventors: Jan Koeppen, Hildesheim (DE); Guenter Neumann, Bad Salzdetfurth (DE); Hans Lausen, Hildesheim (DE); Lutz Bersiner, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,320

(22) PCT Filed: Feb. 23, 1998

(86) PCT No.: PCT/DE98/00532
§ 371 (c)(1),
(2), (4) Date: Sep. 16, 1999

(87) PCT Pub. No.: WO98/44660
PCT Pub. Date: Oct. 8, 1998

(30) Foreign Application Priority Data

Mar. 27, 1997 (DE) .......................................... 197 12 759

(51) Int. Cl.$^7$ ............................................... H04B 10/08
(52) U.S. Cl. ........................................ 359/110; 359/152
(58) Field of Search ................................ 359/110, 152, 359/154, 161, 179

(56) References Cited

U.S. PATENT DOCUMENTS 5,146,357 A * 9/1992 Epstein ........................ 359/152
5,267,068 A * 11/1993 Torihata ....................... 359/110

FOREIGN PATENT DOCUMENTS

EP        0 440 276        7/1991

* cited by examiner

*Primary Examiner*—John Tweel
(74) *Attorney, Agent, or Firm*—Michael J. Striker

(57) ABSTRACT

For checking the transmission in an optical transmission installation with optical fibers for conducting optical useful signals between signal sources and signal acceptors (S/D), at which optical useful signals are coupled into or outcoupled from the optical fibers, which signals can be diverted to substitute paths at nodes (OCC) of the transmission device, checking signals (LS) are transmitted in both directions between the signal sources and signal acceptors (S/D) and nodes (OCC) as applicable in the respective optical fiber for at least one useful signal. The presence of the checking signals (LS) is checked, and in the absence of a checking signal (LS) from one line direction, the transmission of a checking signal (LS) in the opposite direction is suppressed. In this way it is assured that on both sides of a line problem, this problem will be detected and an alarm will be tripped if necessary, or a switchover will be made to a substitute path.

21 Claims, 6 Drawing Sheets

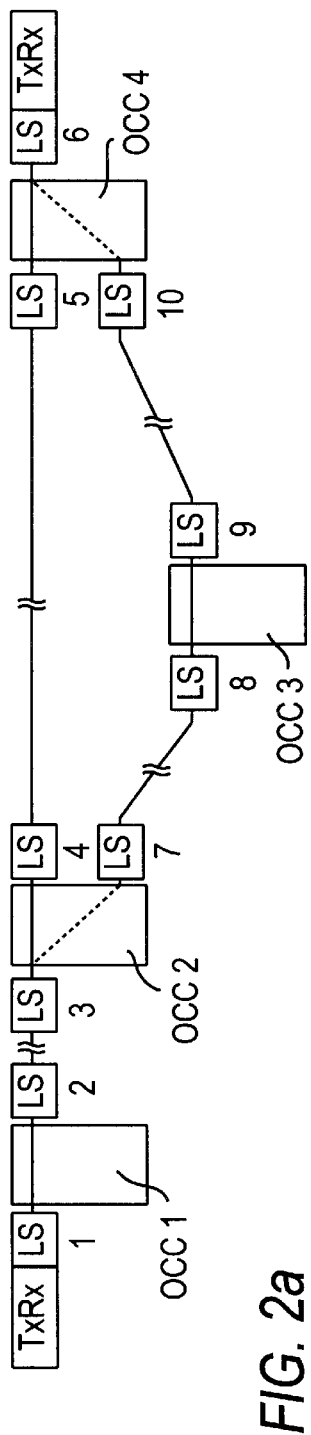
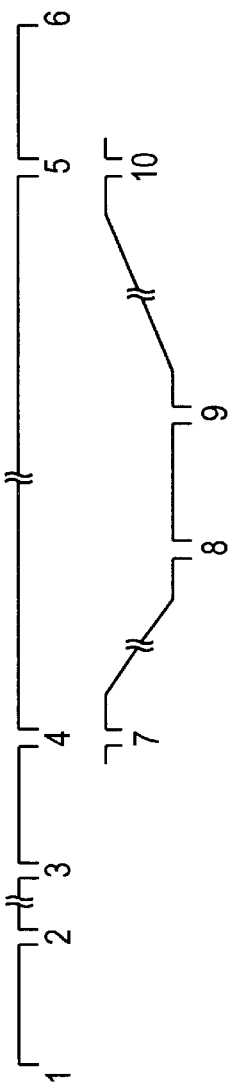
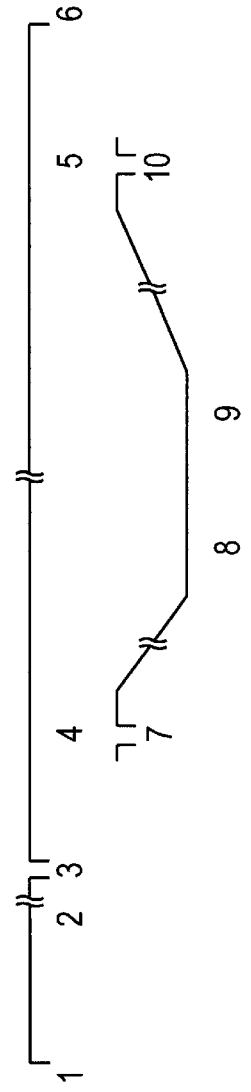
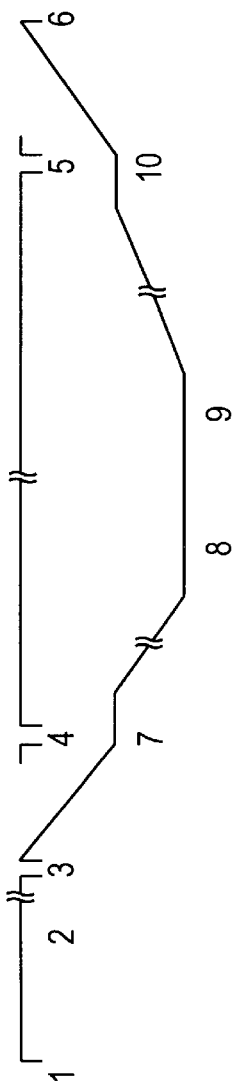
FIG. 2a
FIG. 2b
FIG. 2c
FIG. 2d

OPTICAL TRANSMISSION DEVICE AND METHOD FOR CHECKING TRANSMISSION IN AN OPTICAL TRANSMISSION DEVICE

BACKGROUND OF THE INVENTION

The invention relates to a method for checking the transmission in an optical transmission installation with optical fibers for conducting optical useful signals between signal sources and signal acceptors, at which optical useful signals are coupled into or uncoupled from the optical fibers, which optical useful signals can be diverted to substitute paths at nodes of the transmission device, wherein for at least one useful signal, checking signals are transmitted between the signal source and signal acceptors and the nodes, and the presence of the checking signals is checked.

The invention also relates to an optical transmission installation, suitable for performing the method, with optical fibers for conducting optical useful signals between signal sources and signal acceptors, at which optical useful signals can be coupled into or uncoupled from the optical fibers, and having nodes of the transmission device, at which nodes switchable branching operations of the transmission path are realized wherein active checking devices are present, which are arranged for transmitting and receiving checking signals transmitted in addition to the useful signals in the respective optical fiber.

Optical glass fiber lines have proved to be especially well suited for low-loss transmission of data with a high information density. Data signals present typically in electrical form are for instance converted into optical signals with light emitting diodes or laser diodes and coupled into a suitable optical fiber line. At suitable points of the line network, the signal is detected with a photo diode, for instance, and converted back into an electrical signal, as which it can be further processed in the usual way. This signal transmission is suitable for overcoming great distances. At suitable intervals, amplifiers and/or regenerators are inserted into the appropriate lines; they are intended to assure that the signal will arrive in readily receivable form at the signal acceptor, formed for instance by a photo diode. As in electrical networks, it is necessary to provide nodes, by which signals are carried to ascertain desired receiver and by which it becomes possible to provide a substitute path for a main line path, in the event that the transmission over the main line path should be impeded. By means of suitably provided bytes in an overhead of the useful signal to be transmitted, automatic substitute line circuits can also be made. A disadvantage of this method is that the selection of a substitute path is possible only within a defined transmission standard for the useful signals, and that in the known system an optoelectronic conversion of the signal is necessary at the ends of the segment protected by a substitute path. These ends may not necessarily coincide with the sources and acceptors of the useful signals.

From European Patent Disclosure EP 0 440 276 B1, it is known, outside the useful signal band, to add a communications signal to the useful signal, by means of optical couplers. Thus control and command signals can be transmitted between nodes of the transmission device. While the transmission of the useful signals takes place in the so-called "third window", the "second window" is provided for transmitting the communications signals. The "windows" result from the damping properties of the glass fiber material for certain wavelength ranges. In the "third window", the damping is minimal, while the "second window" is formed by a different damping minimum, but in which the low damping values of the "third window" are not reached. For service communications, the line network thus has its own transmission band available.

SUMMARY OF THE INVENTION

The present invention has the object of being able to react quickly and flexibly to line failures in an optical transmission installation, without substantial impairment of parts of the line network that are not affected by the failure.

In keeping with these objects, one feature of present invention resides, briefly stated, in a method for checking a transmission in an optical transmission installation with optical fibers, wherein in accordance with the present invention the checking signals in the respective optical fibers are transmitted in both directions, and in the absence of a checking signal from one line direction, a transmission of a checking signal in the opposite direction is suppressed.

It is another feature of the present invention to provide an optical transmission installation with optical fibers for conducting optical useful signals between signal sources and signal receptors, in which in accordance with the present invention active checking devices are present at the signal sources and signal acceptors and on both sides of the nodes, and if a checking signal fails to be received from one line direction, the transmission of a checking signal in the opposite direction is discontinued.

According to the invention, the signal paths of the transmission devices are motorized in that in the transmission device fibers, checking signals are transmitted that are transmitted and received by checking signal devices. The checking signal devices are provided at least at the signal sources and signal acceptors and on both sides of the nodes. By means of the checking signal devices, line portions are checked for the presence of checking signals in the fibers arriving in the signal direction at the checking device, and checking signals are fed into the outgoing fibers, so that the presence of checking signals can be checked by checking devices located downstream in terms of the signal conduction direction. A prerequisite here is that in the bidirectional transmission devices, the signal transmission in a fiber takes place in only one direction in each case.

If the active checking device ascertains that a checking signal from one line direction is not received, then the transmission of the checking signal from the checking device to the downstream checking device is discontinued, so that the downstream checking device receives a datum about the nonreception of the checking signal at the downstream checking device. The corresponding data of the checking devices can be used as an indicator signal for a switchover within nodes to a substitute path, if such a substitute path exists. If such a substitute path does not exist, then the indicator signal can be used for issuing an alarm.

The active checking devices are preferably connected to a network controller and output a suitable indicator signal to the network control, so that as needed, recourse can be had to higher-ranking provisions to react to the line failure.

For performing the invention, it is especially advantageous if the active checking devices separate the respective arriving checking signal from the useful signal and add a checking signal again to the outgoing useful signal. This assures that a checking signal will only ever have been generated by the last upstream active checking device, so that for instance checking signals from preceding checking devices will not be detected.

The flexibility of the system of the invention becomes especially great if the active checking devices are switched to be passive by the network controller, and the checking devices that have been made passive conduct only a received checking signal onward. The checking devices that have been made passive then have no function of their own any longer. In this way, it is possible to adapt the length of the checking segment being monitored to the current situation, which can be particularly significant in the choice of substitute paths in a network.

In the future, increasingly a plurality of useful signals will be transmitted by wavelength multiplexing over optical fiber lines. For the present invention, it is expedient, for all the useful signals transmitted on one fiber, to form one common checking signal, which selectably contains the checking data for the individual useful signals. Since the useful signals arriving in common on one fiber are typically distributed in nodes to different output fibers, the new checking signal for the applicable output fiber must be reassembled with the checking data for the useful signals to be transmitted, over the output fiber.

The checking and controlling according to the invention of the transmission devices with the aid of the bidirectionally transmitted checking signals is also appropriate for optical transmission installations over which the useful signals are transmitted in only one direction, that is, unidirectionally. All that is needed then is that the checking signals transmitted in both directions over a transmission segment be separated. In an expedient embodiment, this can be done by transmitting the checking signals in the two opposed directions at different wavelengths so that they can be coupled into the fibers for the useful data or decoupled from the useful data via wavelength-selective couplers. If the checking signals are transmitted at the same wavelength in both directions, then they can be decoupled at the ends of the transmission segments, for instance via optical circulators.

The invention will be described in further detail below in terms of exemplary embodiments shown in the drawing.

BRIEF DESCRIPTION OF THE DRAWINGS

FIGS. 2a–d, an exemplary embodiment for a branching line segment with a schematic illustration of the optical segments and checking signal segments that result for a defective main signal path and an impeded main signal path;

FIG. 1 schematically shows an optical transmission path OP between two signal sources or signal acceptors S/D, which are shown in FIG. 1 as double arrows marking interfaces. Accordingly, one transmitter/receiver or transceiver TxRx is located at each of the ends of the transmission path OP. In the exemplary embodiment shown, the transmission path has three nodes OCC (optical crossconnect) and a plurality of amplifiers/regenerators A.

The transmission path OP is subdivided into optical segments OS, which adjoin each other and each end at the inputs/outputs of the transceivers TxRx and at both terminal points of the nodes OCC, where they allow a checking signal LS (for life signal) to be coupled in. An optical segment OS is not necessarily linked to amplifiers/regenerators, so that the amplifier/regenerators A shown are not absolutely necessary for dividing up the optical segments OS. FIG. 2a shows an exemplary embodiment for a branching transmission path OP between two transceivers TxRx, which are each connected to respective checking devices LS1, LS6 forming circuit points 1 and 6. A first node OCC1 enables the introduction of the useful signals into a transmission path. With respect to the transmission path shown, the first node OCC1, at its output remote from the circuit point 1, has a checking device LS2 at the circuit point 2. This is adjoined by a transmission path that ends at the circuit point 3 and a checking device LS3. This is adjoined by a second node OCC2, which makes branching possible and has two terminals at line points 4 and 7, where checking devices LS4 and LS7 are located. The line point 4, with a remote line point 5 as a regular transmission path, forms a control path 4–5, which ends at a checking device LS5 with a subsequent fourth node OCC4. This node has a further terminal at a line point 10 with a checking device LS10, at which a substitute path 7–10 ends. In the exemplary embodiment shown, a third node OCC3 is connected into the substitute path and is provided on both sides, at line points 8 and 9, with checking devices LS8, LS9.

The other end of the fourth node OCC4 is connected to the transceiver TxRx that terminates the optical transmission path OP and has the checking device LS6.

FIG. 2b shows the resultant optical segments 1–2, 2–3, 3–4, 4–5, 5–6, 7–8, 8–9, and 9–10; the optical segments between the line points 7 and 10 form a substitute for the control path 4–5.

FIG. 2c shows that to check this line configuration, in the case of a functional control path 4–5, only three checking segments 1–3, 3–6, 7–10 are needed; thus the checking devices LS2, LS4, LS5, LS8 and LS9 can be made passive, so that these checking devices need not process a checking signal but instead must merely pass it onward.

The checking signals segments are formed under the following rules:

one checking signal segment always begins and ends at all the sources and acceptors S/D of useful signals;

one checking signal portion always begins/ends at the beginning and ending of a passive transmission path;

one checking signal segment always begins/ends at the beginning/ending of a transmission path protected with a substitute path. The optical segment in the node at the beginning/ending of a checking signal segment forms a unit with the checking signal segment of the corresponding active transmission path.

All the checking devices not needed at a given time at the end of one checking signal segment are made passive; that is, the checking signal is merely passed through them.

If the absence of a checking signal LS is ascertained over the checking segment 1–3, then no substitute path is available, and thus an alarm is sent to a central network controller (telecommunications management network). The operator of the network controller must react to the line failure.

Conversely, if the checking signal fails along the checking segment 3–6 forming a control path, then the nodes OCC2 and OCC4 are made to switch over, and the checking devices are reconfigured, so that now the checking devices LS4 and LS5 are made active, for checking the repair of the checking segment 4–5, while the previously active checking devices LS7 and LS10 can be made passive. The checking segment 3–6 now forms the active substitute path, while the control path 4–5 becomes passive.

The checking signal transmitters of the checking devices LS4 and LS5 are initially, because of the error that has occurred, deactivated but then are periodically reactivated in order to detect any successful repair of the now-passive control path 4–5. If the successful repair is detected, then an automatic switchback to the control path 4–5 can be made. The automatic switchback does not occur, however, if the error that has occurred can be traced back to a partial failure of one of the nodes OCC2 (checking segment 3–4) or OCC4 (checking segment 5–6).

Figure 1:
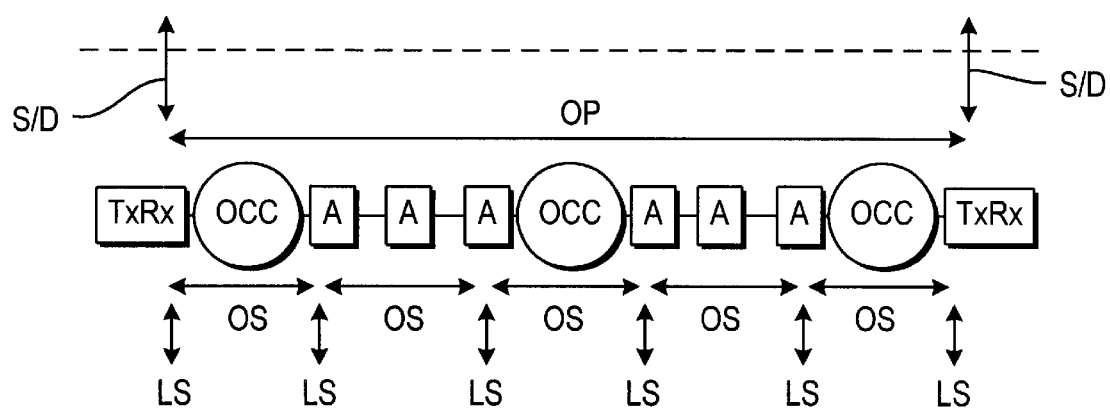
FIG. 1 a schematic illustration of a transmission segment between signal sources and signal acceptors.
Figure 3A:
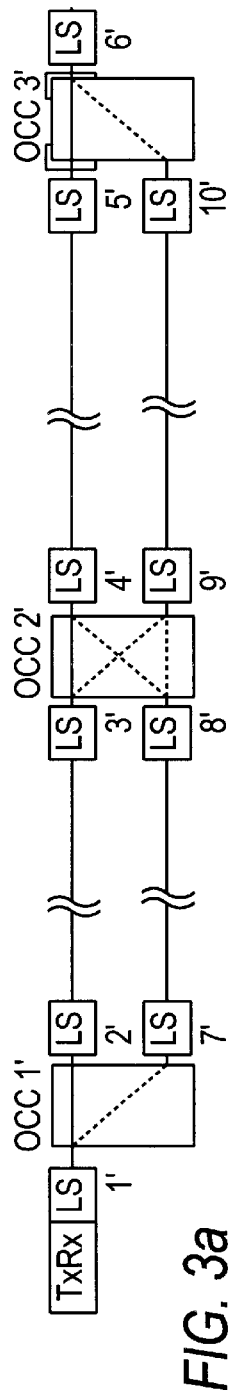
FIGS. 3a–d, an illustration corresponding to FIGS. 2a through 2d for a different exemplary embodiment of a branching line segment.

FIG. 3a shows a different exemplary embodiment for an optical transmission path OP between two transceivers TxRx having checking devices LS1', LS6' at line points 1', 6'. A first node OCC1' forms a branch to two line points 2', 7' with associated checking devices LS2', LS7'. A second node OCC2' is disposed as a cross shunt between control paths 1'–4', 3'–6' and substitute paths 7'–8', 9'–10' and has four terminals to the circuit points 3', 4', 8', 9' having checking devices LS3', LS4', LS8', LS9'.

The two transmission paths, which arrive at line points 5', 10' having checking devices LS5', LS10', are united by a third node OCC3' at the line point 6'.

Figure 3B:
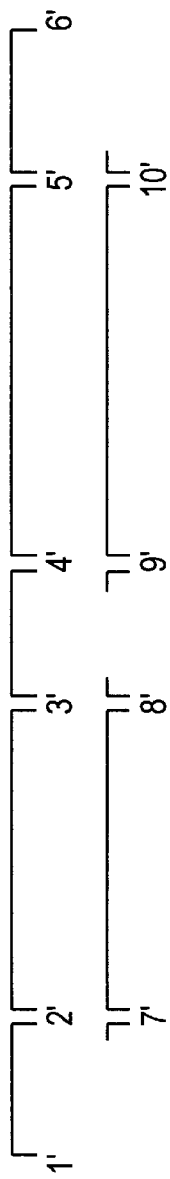

FIG. 3b schematically shows the resultant optical segments 1'–2', 2'–3', 3'–4', 4'–5', 5'–6', 7'–8' and 9'–10'.

Figure 3C:
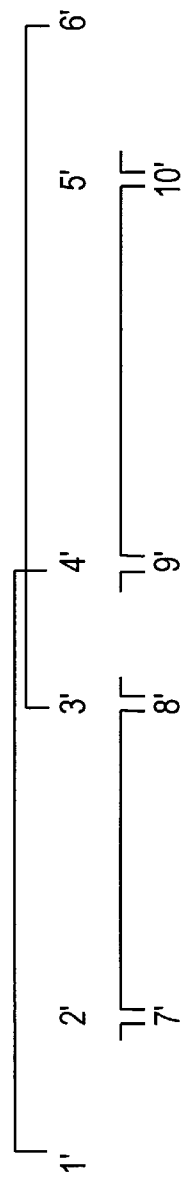

FIG. 3c shows checking segments of the arrangement of FIG. 3a for when no problem is occurring.

From the above rules, it can be seen that one optical segment can belong to a plurality of checking segments, as can also be seen in FIG. 3c for the optical segment 3'–4'. The checking segments in FIG. 3c are the segments 1'–4', 3'–6', 7'–8', and 9'–10'. The active transmission takes place over the segment 1'–2'–3'–4'–5'–6'. The segments 7'–8' and 9'–10 represent initially passive substitute paths.

Figure 3D:
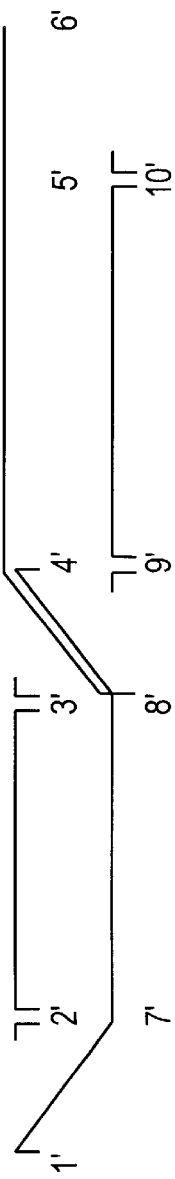

If a problem in the control path 1'–4' is ascertained from a failure of the checking signal, then a switchover is brought about, which is shown in FIG. 3d. The segment 2'–3' becomes passive, and the active transmission now takes place over the substitute path 7'–8', from circuit point 1' to line point 4'. The other substitute path 9'–10' is not needed as a substitute path 9'–10' is not needed as a substitute path in this case, and is accordingly not made active. The checking segments now run from 1' to 4' via the line points 7' and 8', on the one hand, and from 8' to the line point 6' via 4', 5' on the other. In addition, the passive paths 2', 3' and 9', 10' are checked for whether they have obtained or regained their functionality.

FIG. 3d shows that with the present invention, only an actually needed substitute path is made active, which is attained by forming checking segments as shown and by checking the checking signal at the ends of the checking segments. Comparing FIGS. 3c and 3d also shows that once again in the normal case, active checking devices (LS7', LS8') are made passive, and that originally passive checking devices LS2' are made active, if a reconfiguration, for instance as in FIG. 3d compared with FIG. 3c, becomes necessary.

Figure 4:
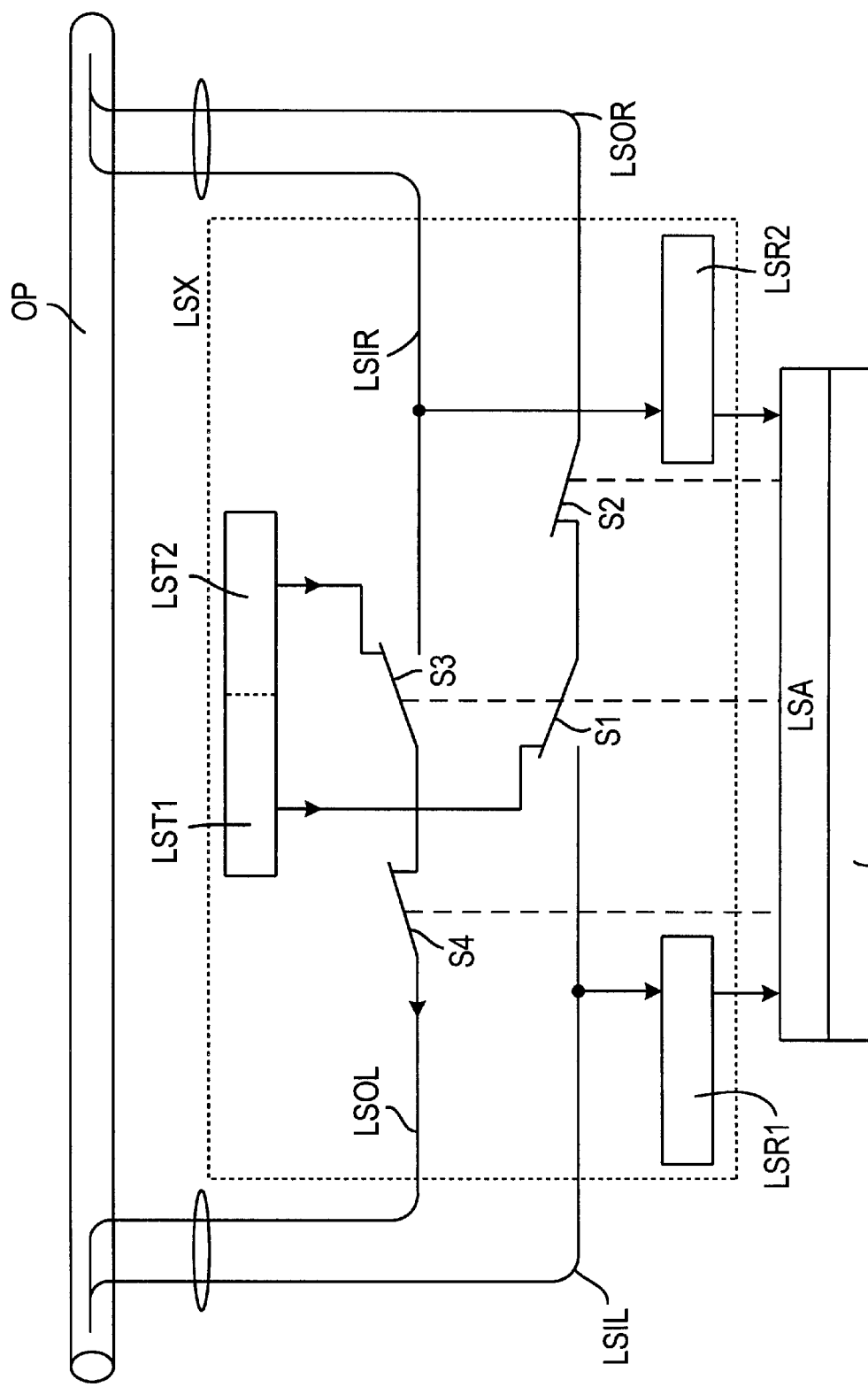
FIG. 4, a schematic illustration of a checking signal device.

FIG. 4 shows the schematic layout of a checking device LSX, which is switched into an optical transmission path OP.

A checking signal LSIL decoupled from an arriving fiber reaches a checking signal receiver LSR1, which carries it on to a checking signal processing LSA. This stage is connected to a component C that controls the node and that in this way receives the information as to when a valid checking signal LSIL has not been received. Similarly, a checking signal receiver LSR2 receives a checking signal LSIR arriving from the other line direction on a fiber of the optical transmission path OP and likewise passes it on to the checking signal processing stage LSA. The checking device LSX includes two checking signal transmitters LST1 and LST2. The first checking signal transmitter LST1, via two switches S1, S2, can feed a checking signal LSOR, as a substitute for the terminated checking signal LSIL, into the appropriate fiber of the optical transmission path OP. Correspondingly, the transmitter LST2 feeds a checking signal LSOL, as a substitute for the checking signal LSIR that has arrived, into the fiber pointing in the opposite direction of the optical transmission path OP, via switches S3, S4. If the checking device LSX is to be made passive, or in other words is merely to pass on the arriving checking signals LSIL and LSIR, then the switches S1, S3 are switched over, so that the checking signal transmitters LST1, LST2 are no longer connected to the corresponding fibers of the optical transmission path OP, and the closed switches S2, S4 merely pass the arriving signals LSIL and LSIR onward.

The switches S2, S4 serve to interrupt the transmission of checking signals LSOL, LSOR, in the event that in the closed transmission path an interruption has occurred so that a transmission of a checking signal in the opposite direction should be suppressed, once no valid checking signal LSIL or LSIR has been received from that direction. The transmission of a checking signal LSOL or LSOR can also be suppressed with the switches S2 and S4, respectively, if, because of an ascertained interruption, the transmission takes place over a substitute path and a transmission of checking signals now occurs only periodically, so that any repair of the transmission path that has failed can be ascertained. Once the successful repair has been detected, the checking signal can then be sent continuously again.

Figure 5A:
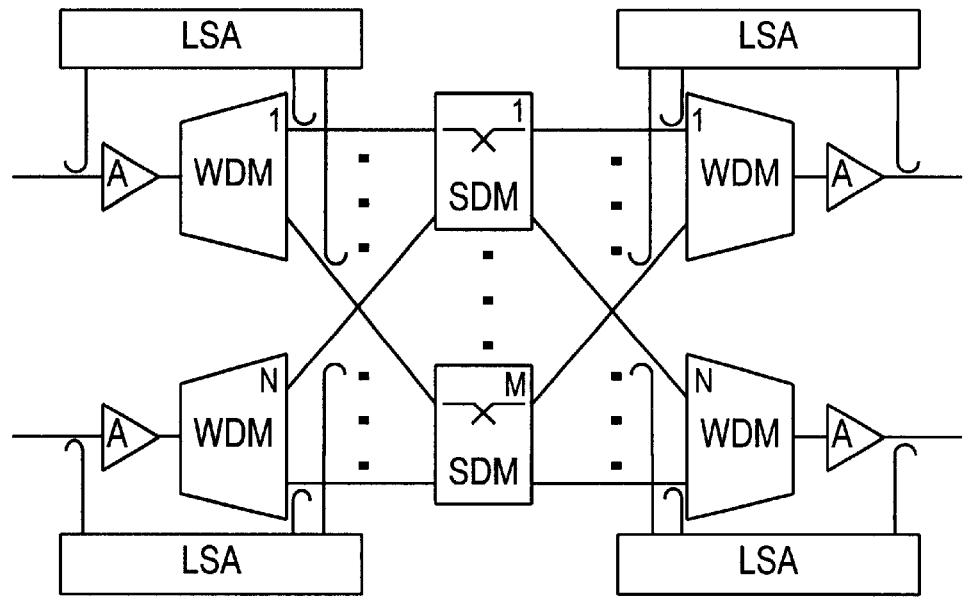
FIGS. 5a and 5b, schematic illustrations for the construction of a node with a plurality of arriving glass fibers and a plurality of outgoing glass fibers, for a checking signal located outside and inside the useful signal band, respectively.

FIG. 5a shows a schematic layout of a node having N arriving fibers and N outgoing fibers, over which a plurality M of useful signals are transmitted by wavelength multiplexing. In the exemplary embodiment shown in FIG. 5a, checking signals are transmitted outside the band used for the useful signals and are therefore taken upstream of an input amplifier A on each fiber and delivered to a checking signal processor LSA. The plurality of M useful signals are demultiplexed in a wavelength demultiplexer WDM for the associated fiber 1 . . . N, or in other words are spatially separated into M wavelengths over M lines. Each wavelength is switched through in a space multiplier coupling network SDM and are delivered via a multiplexer WDM on the output side, in which up to M wavelengths are reunited to form, a wavelength multiplexing signal over one output fiber. Each demultiplexed signal has been provided with the associated checking datum from the arriving checking signal from the checking signal processor LSA on the input side. The checking data of the useful signals united on the output side with a multiplexer WDM are assembled into a checking signal by a checking signal processor LSA on the output side and added to the useful signal at the output of an amplifier A for the output fiber.

Figure 5B:
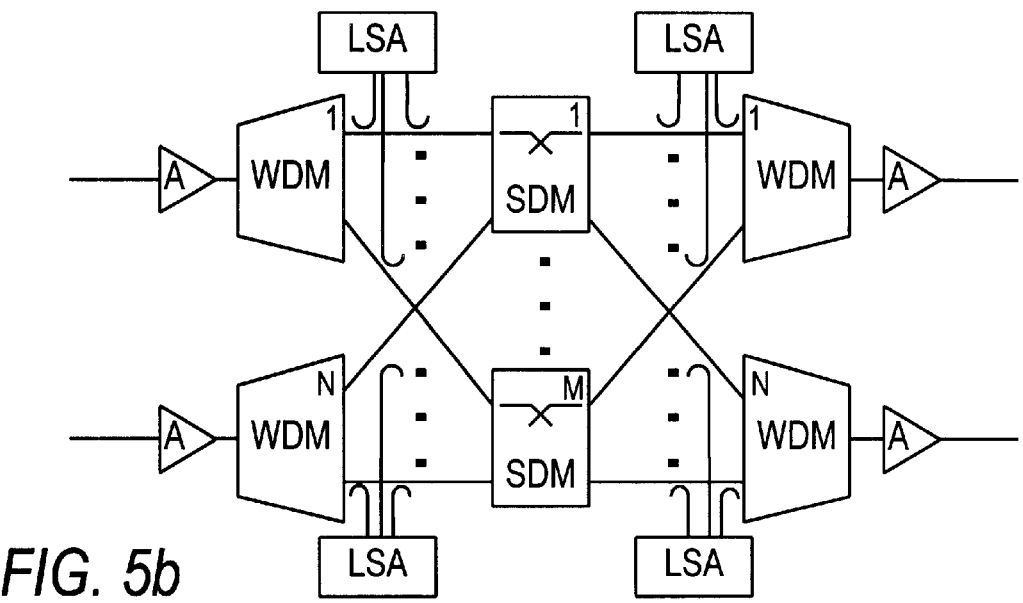

FIG. 5b differs from the exemplary embodiment of FIG. 5a only in that the checking signal is transmitted at a wavelength kept free of useful signals in the useful signal band and is therefore not taken from the checking signal processor LSA until. at the output of the demultiplexer WDM on the input side of the node. Accordingly, the reassembled checking signal is also added to the applicable multiplexer WDM on the output side. The advantage here is on the one had the economy of components and on the other the inclusion of amplifier A in the checking segment.

If with the checking signal processors LSA it is simultaneously decided whether a checking signal is passed onward or terminated, then the described node in this configuration also takes on the tasks of the checking signal devices. LSX on both sides of the node OCC.

Figure 6:
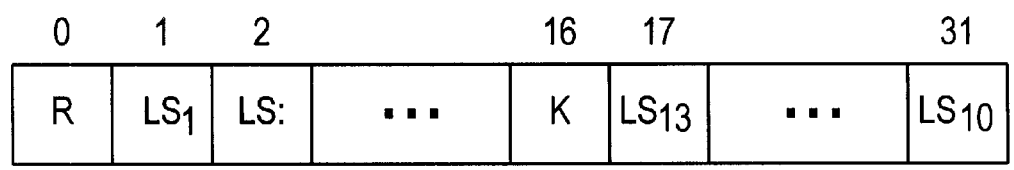
FIG. 6, a schematic illustration for the construction of a checking signal for 30 useful signals.

FIG. 6 shows one possible layout of a checking signal LS, which is transmitted at a wavelength intended for the checking signal within a fiber in which up to 30 useful signals are also transmitted, for instance by wavelength multiplexing. Accordingly, the checking signal LS shown in FIG. 6 contains checking data LS1 . . . LS30 for 30 useful signals. To that end, the checking signal is divided into 32 time slots 0 . . . 31, of which the time slots 0 and 16 are reserved, for detection signals R, K indicating the beginnings of words, and the other time slots 1 . . . 15 and 17 . . . 31 contain checking signals LS1 through LS30. In an 8-bit mode, the checking signals can for instance represent a suitable number.

For transmitting the logical bits, a CMI code under ITU standard ITU-T G 703 is for instance used.

It is understood that the present invention can be used in an entirely analogous way, even if different types of multiplexing are employed, for transmitting a plurality of useful signals in one optical fiber.

Figure 7:
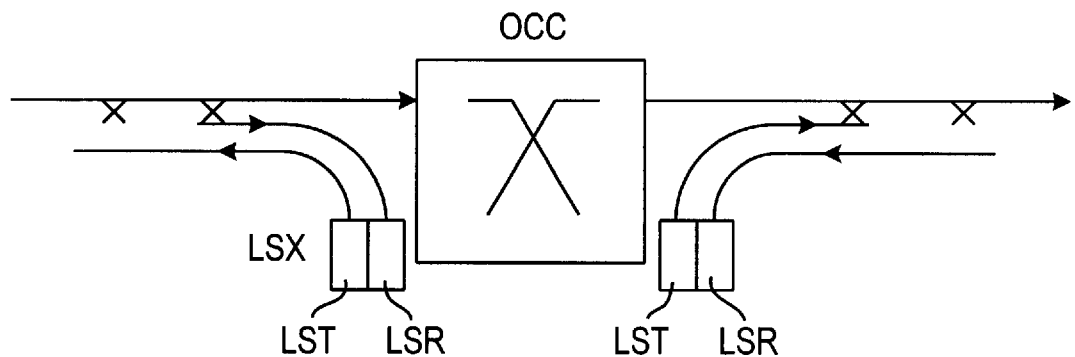
FIG. 7, a schematic illustration of a node with checking signal devices in a transmission device for unidirectionally transmitted useful signals.

FIGS. 6 and 7 schematically show the use of the checking signals of the invention in a unidirectional transmission device for useful signals. In a node OCC, the useful signals thus arrive solely from one direction and are sent on again solely in the other direction. On both sides of the node OCC, there is a checking device LSX, each having one checking signal transmitter LST and one checking signal receiver LSR, because the checking signals are forwarded bidirectionally over the lines that transport the useful data. The separation of the checking signals LS in both directions is done in FIG. 7 using wavelength-selective couplers, which selectively couple the checking signals in and out and are connected via lines to the checking signal transmitter LST and checking signal receiver LSR.

Figure 8:
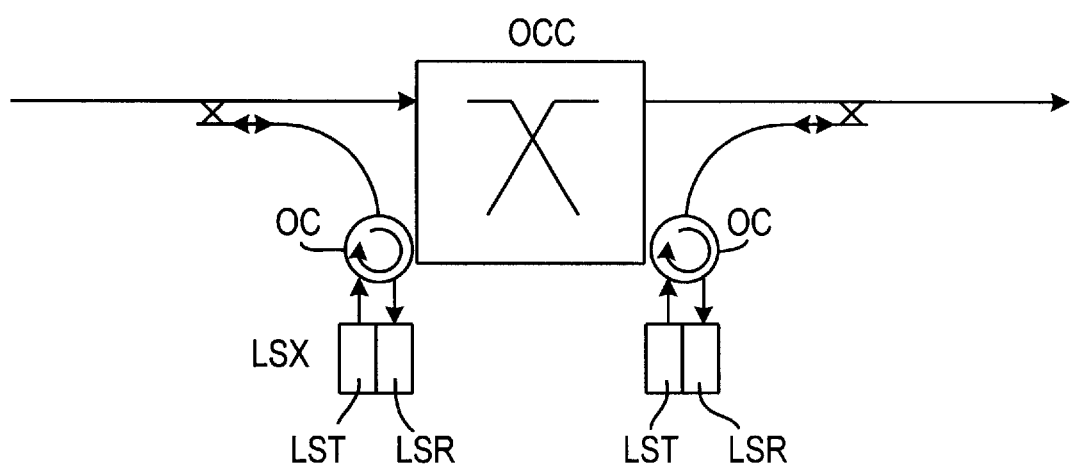
FIG. 8, an alternative embodiment for coupling checking signals into and out of unidirectionally transmitted useful signals.

In the exemplary embodiment shown in FIG. 8, the checking signals can be transmitted at the same wavelength in both directions. Separation is then effected via optical circulators OC, which are connected by one output to the checking signal receiver LSR and by one input to the checking signal transmitter LST of the associated checking device LSX.

What is claimed is:

1. A method of checking a transmission in an optical transmission installation with optical fibers for conducting optical useful signals between signal sources and signal acceptors, at which optical useful signals are coupled into the optical fibers and decoupled from these fibers, which signals are divertable to substitute paths at nodes of a transmission device, the method comprising the steps of transmitting checking signals for at least one useful signal between the signal sources and the signal acceptors and the nodes; checking a presence of the checking signals, said transmitting including transmitting the checking signals in the respective optical fibers in both directions; and in an absence of a checking signal from one line direction, suppressing a transmission of a checking signal in the opposite direction.

2. A method as defined in claim 1; and further comprising the step of providing an automatic switch over to a substitute path in the nodes in presence of the substitute path between the nodes, between which nodes the checking signal is no longer received.

3. A method as defined in claim 1; and further comprising the step of issuing an indicator signal for an alarm in the event of a nonreception of the checking signal.

4. A method as defined in claim 1; and further comprising the steps of separating an arriving checking signal from a useful signal for checking purposes; and adding a new checking signal to an outgoing useful signal.

5. A method as defined in claim 4; and further comprising the step of transmitting the checking signals outside a useful signal band.

6. A method as defined in claim 1; and further comprising the step of assembling the checking signals from ends for a plurality of useful signals that are transmittable over one fiber.

7. A method as defined in claim 1; and further comprising the steps of redistributing useful signals arriving over a plurality of fibers in the node to a plurality of outgoing fibers; and reassembling associated checking signals.

8. A method as defined in claim 1; and further comprising the step of performing a bidirectional transmission and evaluation of the checking signals when useful signals are transmitted unidirectionarily, by separating the checking signals transmitted in both directions from one another.

9. An optical transmission installation, comprising optical fibers for conducting optical useful signals between signal sources and signal acceptors at which optical useful signals are coupleable into or uncoupleable from the optical fiber; a transmission device having, nodes at which switchable branching operations of a transmission path are realized; active checking devices arranged for transmitting and receiving checking signals which are transmitted in addition to a useful signal in the respective optical fiber, said active checking devices being present at said signal sources and at said signal acceptors and on both sides of said nodes, so that if a checking signal fails to be received from one line direction, a transmission of a checking signal in an opposite direction is discontinued.

10. An optical transmission installation as defined in claim 9, wherein said active checking devices are formed so that upon non reception of a checking signal, they generate an indicator signal for issuing an alarm.

11. An optical transmission installation as defined in claim 9, wherein said active checking devices are formed so that upon non reception of a checking signal, they generate an indicator signal switchover of a node.

12. An optical transmission installation as defined in claim 9; and further comprising a network controller, said active checking devices being connected to said network controller and, if a checking signal is not received, said checking devices output an indicator signal to said network controller.

13. An optical transmission installation as defined in claim 9, wherein said active checking devices are formed so that they separate an arriving checking signal from a useful signal and add a checking signal to an outgoing useful signal.

14. An optical transmission installation as defined in claim 9; and further comprising a network controller, said active checking devices are switchable to be passive by said network controller, so that said checking devices that have been switched to be passive merely conduct a received checking signal onwards.

15. An optical transmission installation as defined in claim 9, wherein said checking signal devices have receivers and transmitters for the checking signals outside the useful signal band.

16. An optical transmission installation as defined in claim 9, wherein said checking signal devices have receivers and transmitters for the checking signals inside the useful signal band.

17. An optical transmission installation as defined in claim 9, wherein said checking devices have transmitters and receivers arranged for receiving and transmitting checking signals that contain checking data for a plurality of useful signals transmitted over an applicable fiber.

18. An optical transmission installation as defined in claim 17, wherein said nodes are formed so that in said nodes useful signals arriving over a plurality of fibers are redistributable to a plurality of outgoing fibers, said nodes being arranged for a reassembly of associated checking signals.

19. An optical transmission installation as defined in claim 9, wherein the signal sources and signal acceptors are arranged for unidirectional transmission of the useful signals, said checking devices being arranged for bidirectional transmission of the checking signals.

20. An optical transmission installation as defined in claim 19, wherein said checking devices are provided with checking signal receivers and checking signal transmitters arranged for various wavelengths.

21. An optical transmission installation as defined in claim 9; and further comprising optical circulators connecting said checking devices to said fibers.

* * * * *